United States Patent
Nam et al.

(10) Patent No.: US 8,971,261 B2
(45) Date of Patent: Mar. 3, 2015

(54) METHOD AND SYSTEM FOR TRANSMITTING CHANNEL STATE INFORMATION IN WIRELESS COMMUNICATION SYSTEMS

(75) Inventors: Young-Han Nam, Richardson, TX (US); Jianzhong Zhang, Plano, TX (US); Jin-Kyu Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 470 days.

(21) Appl. No.: 13/115,900

(22) Filed: May 25, 2011

(65) Prior Publication Data

US 2011/0299484 A1 Dec. 8, 2011

Related U.S. Application Data

(60) Provisional application No. 61/350,887, filed on Jun. 2, 2010, provisional application No. 61/421,119, filed on Dec. 8, 2010.

(51) Int. Cl.
*H04W 4/00* (2009.01)
*H04L 1/18* (2006.01)
(Continued)

(52) U.S. Cl.
CPC ............ *H04L 1/1896* (2013.01); *H04L 1/0025* (2013.01); *H04W 72/1278* (2013.01)
USPC ........................................................ 370/329

(58) Field of Classification Search
USPC ........................................................ 370/329
See application file for complete search history.

(56) References Cited

U.S. PATENT DOCUMENTS 5,583,500 A 12/1996 Allen et al.
6,854,082 B1 2/2005 Rhee
(Continued)

FOREIGN PATENT DOCUMENTS

KR 1020070035283 A 3/2007
KR 1020090093763 A 9/2009
(Continued)

OTHER PUBLICATIONS

"3rd Generation Partnership Project; Technical Specification Group Radio Access Network; Evolved Universal Terrestrial Radio Access (E-UTRA); Ohysical Channels and Modulation (Release 9)", 3GPP TS 36.211 v9.1.0, Mar. 2010, 85 pages.
(Continued)

*Primary Examiner* — Brian Roberts
*Assistant Examiner* — Abu-Sayeed Haque

(57) ABSTRACT

A base station includes a transmit path circuitry to transmit an uplink grant in a DCI format to a subscriber station. The base station also includes a receive path circuitry to receive only UCI on a PUSCH from a subscriber station when the uplink grant includes a MCS of an enabled transport block (TB) with a value of 29, or a redundancy version of the PUSCH with a value of 1; a CSI request field with a non-zero value; and a total number of physical resource blocks allocated for the subscriber station, $N_{PRB}$, with a value less than or equal to a threshold number of physical resource blocks, $T_{PRB}$. $T_{PRB}$ is based at least partly upon one of a total number of CSI information bits to be transmitted on the PUSCH, $N_{total}$, and a number of DL CCs reported in a current CSI reporting, $N_{CCs}$.

28 Claims, 5 Drawing Sheets

(51) Int. Cl.
*H04L 1/00* (2006.01)
*H04W 72/12* (2009.01)

(56) References Cited

U.S. PATENT DOCUMENTS

| | | |
|---|---|---|
| 7,334,181 B2 | 2/2008 | Eroz et al. |
| 7,343,539 B2 | 3/2008 | Divsalar et al. |
| 7,480,845 B2 | 1/2009 | Kim et al. |
| 7,499,490 B2 | 3/2009 | Divsalar et al. |
| 7,734,988 B2 | 6/2010 | Kim et al. |
| 7,890,844 B2 | 2/2011 | Jeong et al. |
| 7,966,548 B2 | 6/2011 | Jacobsen et al. |
| 7,984,368 B2 | 7/2011 | Pisek et al. |
| 8,006,162 B2 | 8/2011 | Choi et al. |
| 8,117,523 B2 | 2/2012 | Divsalar et al. |
| 8,132,072 B2 | 3/2012 | El-Khamy et al. |
| 8,161,363 B2 | 4/2012 | Jeong et al. |
| 8,209,592 B2 | 6/2012 | Pisek et al. |
| 8,239,746 B2 | 8/2012 | Divsalar et al. |
| 8,386,906 B2 | 2/2013 | Shen et al. |
| 2006/0203765 A1 | 9/2006 | Laroia et al. |
| 2006/0294445 A1 | 12/2006 | Divsalar et al. |
| 2007/0043998 A1 | 2/2007 | Lakkis |
| 2007/0094568 A1 | 4/2007 | Choi et al. |
| 2007/0162815 A1 | 7/2007 | El-Khamy et al. |
| 2008/0126916 A1 | 5/2008 | Chung et al. |
| 2008/0178065 A1 | 7/2008 | Khandekar et al. |
| 2009/0013239 A1 | 1/2009 | Blanksby |
| 2009/0063933 A1 | 3/2009 | Richardson et al. |
| 2009/0070659 A1 | 3/2009 | Zhong et al. |
| 2009/0300461 A1 | 12/2009 | Shor et al. |
| 2010/0080187 A1* | 4/2010 | Papasakellariou et al. ... 370/329 |
| 2010/0098012 A1* | 4/2010 | Bala et al. ............ 370/329 |
| 2010/0165931 A1* | 7/2010 | Nimbalker et al. ......... 370/329 |
| 2010/0226269 A1* | 9/2010 | Chakraborty et al. ....... 370/252 |
| 2010/0238823 A1* | 9/2010 | Chen et al. ............ 370/252 |
| 2011/0002290 A1 | 1/2011 | Kim et al. |
| 2011/0047433 A1 | 2/2011 | Abu-Surra et al. |
| 2011/0066916 A1 | 3/2011 | Abu-Surra et al. |
| 2011/0299484 A1 | 12/2011 | Nam et al. |
| 2011/0307760 A1 | 12/2011 | Pisek et al. |
| 2012/0084625 A1 | 4/2012 | Pisek et al. |
| 2012/0240001 A1 | 9/2012 | Abu-Surra et al. |

FOREIGN PATENT DOCUMENTS

| | | |
|---|---|---|
| KR | 1020100032346 A | 3/2010 |
| KR | 1020100047155 A | 5/2010 |
| WO | WO 2009-096757 A2 | 8/2009 |
| WO | WO 2009-135574 A1 | 11/2009 |
| WO | WO 2010-048142 A1 | 4/2010 |
| WO | WO 2011-085230 A2 | 7/2011 |
| WO | WO 2011-127092 A1 | 10/2011 |

OTHER PUBLICATIONS

International Search Report dated Feb. 23, 2012 in connection with International Patent Application No. PCT/KR2011/004051.
Written Opinion of the International Searching Authority dated Feb. 23, 2012 in connection with International Patent Application No. PCT/KR2011/004051.
Office Action dated Jul. 19, 2013 in connection with U.S. Appl. No. 13/159,091.
International Search Report dated May 31, 2011 in connection with International Patent Application No. PCT/KR2010/006362.
Written Opinion of the International Searching Authority dated May 31, 2011 in connection with International Patent Application No. PCT/KR2010/006362.
Sunghwan Kim, et al., "Quasi-Cyclic Low-Density Parity-Check Codes With Girth Larger Than 12", IEEE Transactions on Information Theory, vol. 53, No. 8, Aug. 2007, p. 2885-2891.
Eran Sharon, et al., "Generating Good Finite Length LDPC Codes Based on Lifted Graphs", Forty-Fourth Annual Allerton Conference, Sep. 27-29, 2006, p. 41-50.
Gianluigi Liva, et al., "Design of LDPC Codes: A Survey and New Results", J. Comm. Software and Systems, Sep. 2006, 22 pages.
N. Jacobsen, et al., "Design of rate-compatible irregular LDPC codes based on edge growth and parity splitting", in Proc. IEEE Vehicular Technology Conference (VTC); 30 2007; Oct. 3, 2007, p. 1052-1056.
H-G Joo, et al., "New Construction of Rate-Compatible Block-Type Low-Desity Parity-Check Codes Using Splitting", Proc. IEEE (PIMRC 2006), Sep. 2006, 5 pages.
Notification of Transmittal of the International Search Report and the Written Opinion of the International Searching Authority dated Feb. 10, 2012 in connection with International Patent Application No. PCT/KR2011/004351.
Andrew Blanksby, et al., "LDPC Code Set for mmWave Communication", mmCom '10, Sep. 24, 2010, p. 39-43.
Shadi Abu-Surra, et al., "Gigabit Rate Achieving Low-Power LDPC Codes: Design and Architecture", 6 pages.
Thomas Henige, et al., "High-Throughput Low-Power LDPC Decoder and Code Design", 2011, 6 pages.
Notice of Allowance dated Jan. 2, 2014 in connection with U.S. Appl. No. 13/159,091.
Office Action dated Oct. 16, 2013 in connection with U.S. Appl. No. 13/248,900.
Office Action dated Feb. 5, 2014 in connection with U.S. Appl. No. 13/248,900.
Huawei, "Remaining Issues in asperiodic CQI-only PUSCH," 3GPP TSG RAN WG1, Meeting #63bis, R1-110015, Dublin, Ireland, Jan. 17-21, 2011, 4 pages.
Qualcomm Incorporated, "CQI Only Transmission on PUSCH," 3GPP TSG-RAN WG1 #63, R1-106368, Jacksonville, USA, Nov. 15-19, 2010, 5 pages.
Japanese Office Action, dated Oct. 6, 2014, in connection with Japan Patent Application No. 2013-513113, 15 pages.
3GPP TS 36.213 V9.1.0; "Physical layer procedures"; Release 9; Mar. 2010; 79 pages.

* cited by examiner

METHOD AND SYSTEM FOR TRANSMITTING CHANNEL STATE INFORMATION IN WIRELESS COMMUNICATION SYSTEMS

CROSS-REFERENCE TO RELATED APPLICATION(S) AND CLAIM OF PRIORITY

The present application is related to U.S. Provisional Patent Application No. 61/350,887, filed Jun. 2, 2010, entitled "CHANNEL QUALITY INFORMATION REQUESTS IN WIRELESS COMMUNICATION SYSTEMS" and U.S. Provisional Patent Application No. 61/421,119, filed Dec. 8, 2010, entitled "TRANSMISSION OF CHANNEL STATE INFORMATION IN WIRELESS COMMUNICATION SYSTEMS". Provisional Patent Application Nos. 61/350,887 and 61/421,119 are assigned to the assignee of the present application and are hereby incorporated by reference into the present application as if fully set forth herein. The present application hereby claims priority under 35 U.S.C. §119(e) to U.S. Provisional Patent Application Nos. 61/350,887 and 61/421,119.

TECHNICAL FIELD OF THE INVENTION

The present application relates generally to wireless communications and, more specifically, to a method and system for transmitting channel state information in wireless communication systems.

BACKGROUND OF THE INVENTION

In $3^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A base station is provided. The base station includes a transmit path circuitry configured to transmit an uplink grant in a downlink control information (DCI) format to a subscriber station. The base station also includes a receive path circuitry configured to receive only uplink control information (UCI) on a physical uplink shared channel (PUSCH) from the subscriber station when the uplink grant includes a modulation and coding scheme (MCS) of an enabled transport block (TB) with a value of 29, or a redundancy version of the PUSCH is 1; a channel state information (CSI) request field with a non-zero value; and a total number of physical resource blocks allocated for the subscriber station, $N_{PRB}$, with a value less than or equal to a threshold number of physical resource blocks, $T_{PRB}$. $T_{PRB}$ is based at least partly upon one of a total number of CSI information bits to be transmitted on the PUSCH, $N_{total}$, and a number of downlink component carriers (DL CCs) reported in a current CSI reporting, $N_{CCs}$.

A method of operating a base station is provided. The method includes transmitting an uplink grant in a downlink control information (DCI) format to a subscriber station. The method also includes receiving only uplink control information (UCI) on a physical uplink shared channel (PUSCH) from the subscriber station when the uplink grant includes a modulation and coding scheme (MCS) of an enabled transport block (TB) with a value of 29, or a redundancy version of the PUSCH with a value of 1; a channel state information (CSI) request field with a non-zero value; and a total number of physical resource blocks allocated for the subscriber station, $N_{PRB}$, with a value less than or equal to a threshold number of physical resource blocks, $T_{PRB}$. $T_{PRB}$ is based at least partly upon one of a total number of CSI information bits to be transmitted on the PUSCH, $N_{total}$, and a number of downlink component carriers (DL CCs) reported in a current CSI reporting, $N_{CCs}$.

A subscriber station is provided. The subscriber station includes a receive path circuitry configured to receive an uplink grant in a downlink control information (DCI) format from a base station. The subscriber station also includes a transmit path circuitry configured to transmit only uplink control information (UCI) on a physical uplink shared channel (PUSCH) to the base station when the uplink grant includes a modulation and coding scheme (MCS) of an enabled transport block (TB) with a value of 29, or a redundancy version of the PUSCH with a value of 1; a channel state information (CSI) request field with a non-zero value; and a total number of physical resource blocks allocated for the subscriber station, $N_{PRB}$, with a value less than or equal to a threshold number of physical resource blocks, $T_{PRB}$. $T_{PRB}$ is based at least partly upon one of a total number of CSI information bits to be transmitted on the PUSCH, $N_{total}$, and a number of downlink component carriers (DL CCs) reported in a current CSI reporting, $N_{CCs}$.

A method of operating a subscriber station, the method includes receiving an uplink grant in a downlink control information (DCI) format from a base station. The method also includes transmitting only uplink control information (UCI) on a physical uplink shared channel (PUSCH) to the base station when the uplink grant includes a modulation and coding scheme (MCS) of an enabled transport block (TB) with a value of 29, or a redundancy version of the PUSCH with a value of 1; a channel state information (CSI) request field with a non-zero value; and a total number of physical resource blocks allocated for the subscriber station, $N_{PRB}$, with a value less than or equal to a threshold number of physical resource blocks, $T_{PRB}$. $T_{PRB}$ is based at least partly upon one of a total number of CSI information bits to be transmitted on the PUSCH, $N_{total}$, and a number of downlink component carriers (DL CCs) reported in a current CSI reporting, $N_{CCs}$.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE terms "node B", "enhanced node B", and "eNodeB" are other terms for "base station" used below. Also, the LTE term "user equipment" or "UE" is another term for "subscriber station" used below.

Figure 1:
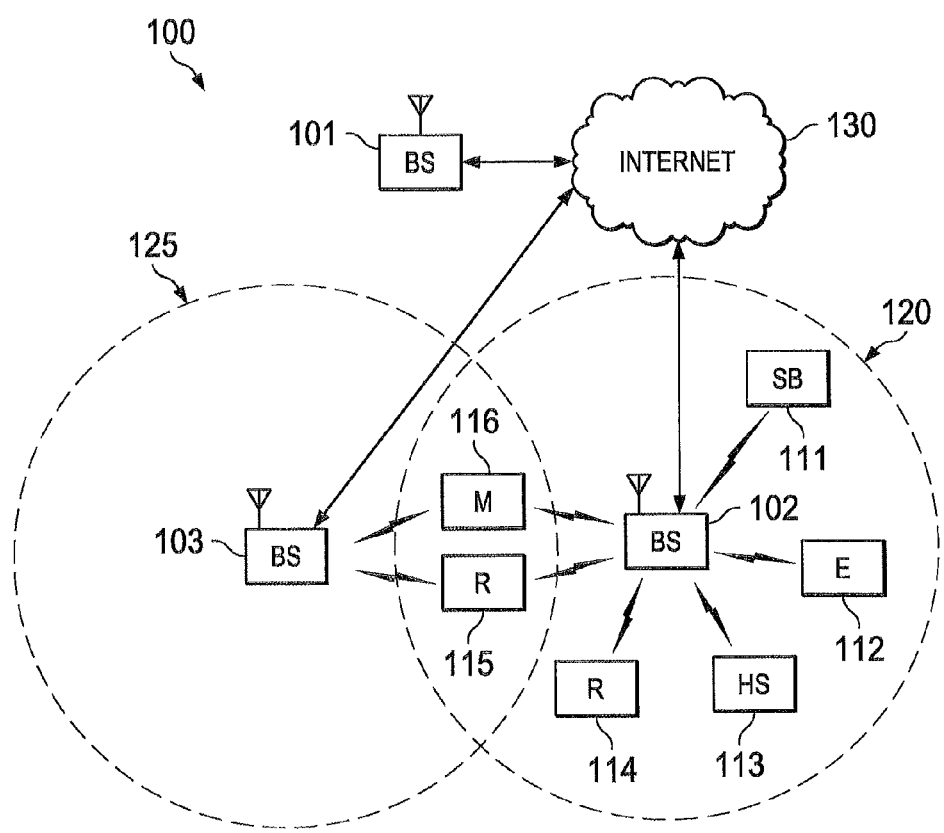
FIG. 1 illustrates an exemplary wireless network that transmits messages in the uplink according to the principles of this disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
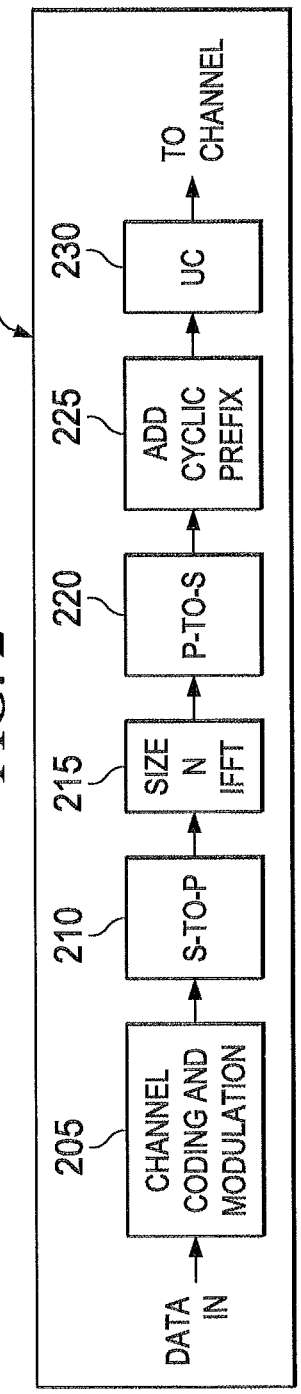
FIG. 2 is a high-level diagram of an orthogonal frequency division multiple access (OFDMA) transmitter according to one embodiment of this disclosure.
Figure 3:
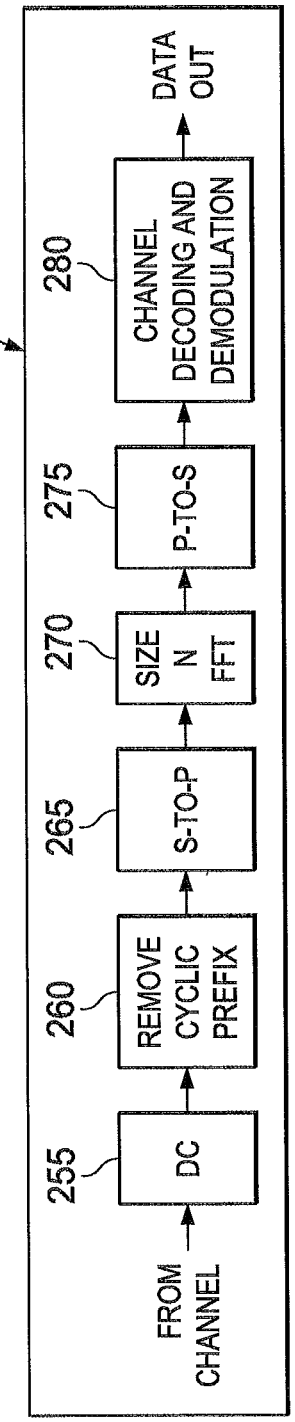
FIG. 3 is a high-level diagram of an OFDMA receiver according to one embodiment of this disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, and an up-converter (UC) 230.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that, for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL}N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $D_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where $k=0, \ldots, N_{RB}^{DL}N_{sc}^{RB}-1$ and $l=0, \ldots, N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ used to denote a resource element used for reference signal transmission on antenna port p.

UE-specific reference signals (or dedicated RS: DRS) are supported for single-antenna-port transmission on the Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

Figure 4:
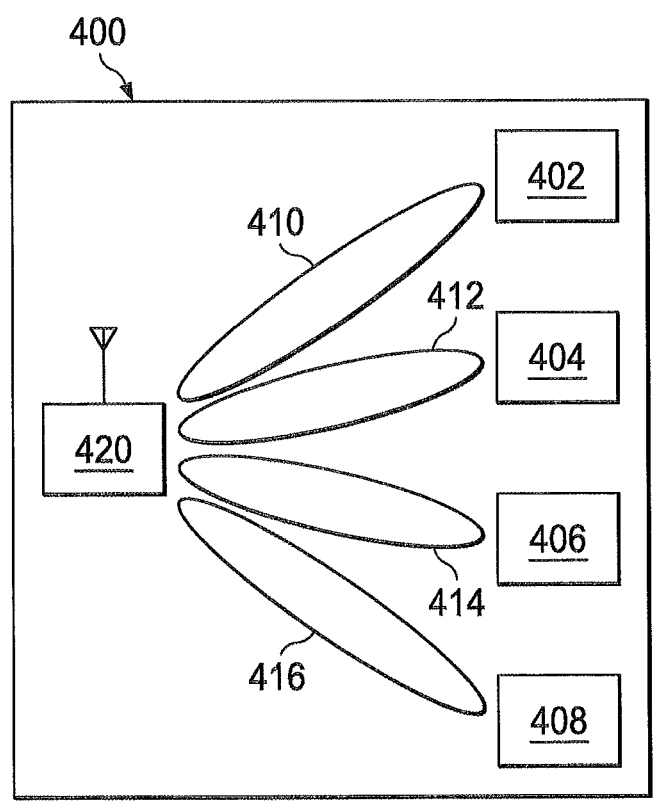
FIG. 4 illustrates a diagram of a base station in communication with a plurality of mobile stations according to an embodiment of this disclosure.

FIG. 4 illustrates a diagram 400 of a base station 420 in communication with a plurality of mobile stations 402, 404, 406, and 408 according to an embodiment of this disclosure.

As shown in FIG. 4, base station 420 simultaneously communicates with multiple of mobile stations through the use of multiple antenna beams, each antenna beam is formed toward its intended mobile station at the same time and same frequency. Base station 420 and mobile stations 402, 404, 406, and 408 are employing multiple antennas for transmission and reception of radio wave signals. The radio wave signals can be Orthogonal Frequency Division Multiplexing (OFDM) signals.

In this embodiment, base station 420 performs simultaneous beamforming through a plurality of transmitters to each mobile station. For instance, base station 420 transmits data to mobile station 402 through a beamformed signal 410, data to mobile station 404 through a beamformed signal 412, data to mobile station 406 through a beamformed signal 414, and data to mobile station 408 through a beamformed signal 416. In some embodiments of this disclosure, base station 420 is capable of simultaneously beamforming to the mobile stations 402, 404, 406, and 408. In some embodiments, each beamformed signal is formed toward its intended mobile station at the same time and the same frequency. For the purpose of clarity, the communication from a base station to a mobile station may also be referred to as downlink communication, and the communication from a mobile station to a base station may be referred to as uplink communication.

Base station 420 and mobile stations 402, 404, 406, and 408 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 402, 404, 406, and 408 may be any device that is capable receiving wireless signals. Examples of mobile stations 402, 404, 406, and 408 include, but are not limited to, a personal data assistant (PDA), laptop, mobile telephone, handheld device, or any other device that is capable of receiving the beamformed transmissions.

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N) (i.e., K=min(M,N)). A MIMO system can be implemented with the schemes of spatial multiplexing, a transmit/receive beamforming, or transmit/receive diversity.

As an extension of SU-MIMO, multi-user MIMO (MU-MIMO) is a communication scenario where a base station with multiple transmit antennas can simultaneously communicate with multiple mobile stations through the use of multi-user beamforming schemes such as Spatial Division Multiple Access (SDMA) to improve the capacity and reliability of a wireless communication channel.

Figure 5:
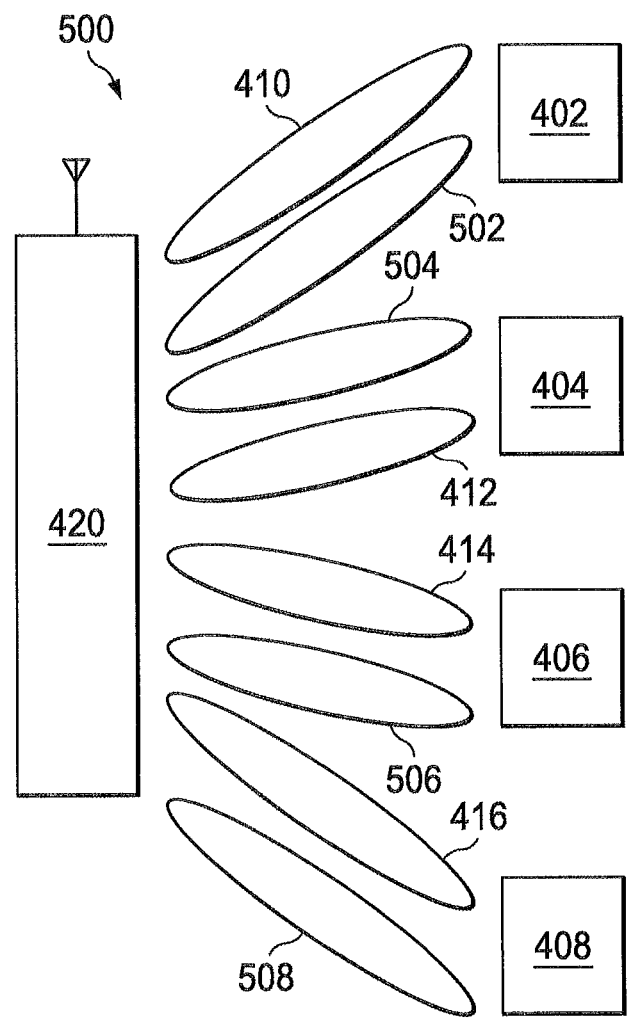
FIG. 5 illustrates a spatial division multiple access (SDMA) scheme according to an embodiment of this disclosure.

FIG. 5 illustrates a SDMA scheme according to an embodiment of this disclosure.

As shown in FIG. 5, base station 420 is equipped with 8 transmit antennas while mobile stations 402, 404, 406, and 408 are each equipped two antennas. In this example, base station 420 has eight transmit antennas. Each of the transmit antennas transmits one of beamformed signals 410, 502, 504, 412, 414, 506, 416, and 508. In this example, mobile station 402 receives beamformed transmissions 410 and 502, mobile station 404 receives beamformed transmissions 504 and 412, mobile station 406 receives beamformed transmissions 506 and 414, and mobile station 408 receives beamformed transmissions 508 and 416.

Since base station 420 has eight transmit antenna beams (each antenna beams one stream of data streams), eight streams of beamformed data can be formed at base station 420. Each mobile station can potentially receive up to 2 streams (beams) of data in this example. If each of the mobile stations 402, 404, 406, and 408 was limited to receive only a single stream (beam) of data, instead of multiple streams simultaneously, this would be multi-user beamforming (i.e., MU-BF).

In 3GPP LTE Release 8/9, a UE may transmit up to one CW in a subframe. According to R1-106540, "Way Forward On Aperiodic CSI Triggering," November 2010, which is hereby incorporated by reference into the present application as if fully set forth herein, in order to determine the modulation order, redundancy version and transport block (TB) size for the physical uplink shared channel (PUSCH), the UE first:
reads the "modulation and coding scheme and redundancy version" field ($I_{MCS}$),
checks the "CQI request" bit,
computes the total number of allocated physical resource blocks (PRBs) ($N_{PRB}$) based on the procedure defined in Section 8.1 of R1-106557, Change Request for 3GPP Technical Specification No. 36.213, December 2010, which is hereby incorporated by reference into the present application as if fully set forth herein, and
computes the number of coded symbols for the control information.

For $0 \le I_{MCS} \le 28$, the modulation order ($Q_m$) is determined as follows:
if the UE is capable of supporting 64 QAM in the PUSCH and has not been configured by higher layers to transmit only QPSK and 16 QAM, the modulation order is given by $Q'_m$ in Table 8.6.1-1;
if the UE is not capable of supporting 64 QAM in the PUSCH or has been configured by higher layers to transmit only QPSK and 16 QAM, $Q'_m$ is first read from Table 8.6.1-1, and the modulation order is set to $Q'_m=\min(4, Q'_m)$; and
if the parameter ttiBundling provided by higher layers is set to TRUE, then the resource allocation size is restricted to $N_{PRB} \le 3$ and the modulation order is set to $Q_m=2$.

For $29 \le I_{MCS} \le 31$, if $I_{MCS}=29$, the "CQI request" bit field in an uplink DCI format is set to trigger a report and $N_{PRB} \le 4$, the modulation order is set to $Q_m=2$. Otherwise, the modulation order is determined from the downlink control information (DCI) transported in the latest physical downlink control channel (PDCCH) with DCI format 0 for the same transport block using $0 \le I_{MCS} \le 28$. If there is no PDCCH with DCI format 0 for the same transport block using $0 \le I_{MCS} \le 28$, the modulation order is determined from:
the most recent semi-persistent scheduling assignment PDCCH when the initial PUSCH for the same transport block is semi-persistently scheduled, or
the random access response grant for the same transport block when the PUSCH is initiated by the random access response grant.

The UE uses $I_{MCS}$ and Table 8.6.1-1 to determine the redundancy version ($rv_{idx}$) to use in the physical uplink shared channel.

In Release 8/9, when the information elements (IEs) in DCI format 0 satisfy the following sets of conditions, there is no transport block (TB) for the uplink shared channel (UL-SCH) and only the uplink control information (UCI) will be transmitted by the UE where the UCI coded bits are modulated by QPSK ($Q_m=2$):
$I_{MCS}=29$,
CQI request=1, and
$N_{PRB} \le 4$.

In Release 10 LTE-Advanced, UL MIMO SM is introduced and a new DCI format, DCI format 4, was defined in R1-106556, Change Request for 3GPP Technical Specification No. 36.212, December 2010, which is hereby incorporated by reference into the present application as if fully set forth herein.

DCI format 4 is used for the scheduling of the PUSCH in one UL cell with multi-antenna port transmission mode.

The DL cell from which the PUSCH assignments for a given UL cell originate is configured by higher layers.

The following information is transmitted by the DCI format 4:
Carrier indicator—0 or 3 bits. This field is only present if configured by higher layers for the recipient UE. The mapping from a carrier indicator value to a cell is UE specific and configured by higher layers.
Resource block assignment and hopping resource allocation —

$$\left\lceil \log_2\left(\binom{\lceil N_{RB}^{UL}/P + 1 \rceil}{4}\right)\right\rceil$$

bits, where the value of P depends on the number of DL resource blocks as indicated in section 7.1.6 of R1-106557, Change Request for 3GPP Technical Specification No. 36.213, December 2010.

For single-cluster allocation, the ($\lceil \log_2(N_{RB}^{UL}(N_{RB}^{UL}+1)/2)\rceil$) least significant bits (LSBs) provide the resource allocation in the UL subframe as defined in section 8.1 of R1-106557, Change Request for 3GPP Technical Specification No. 36.213, December 2010.

For multi-cluster allocation, all the bits in the field provide the resource allocation in the UL subframe as defined in R1-106557, Change Request for 3GPP Technical Specification No. 36.213, December 2010.

TPC command for scheduled PUSCH.

Cyclic shift for demodulation reference signals (DM RS) and orthogonal cover code (OCC) index—3 bits as defined in section 5.5.2.1.1 of R1-106556, Change Request for 3GPP Technical Specification No, 36.212, December 2010, which is hereby incorporated by reference into the present application as if fully set forth herein.

UL index—2 bits as defined in sections 5.1.1.1, 7.2.1, 8 and 8.4 of R1-106557, Change Request for 3GPP Technical Specification No. 36.213, December 2010. This field is present only for Time-division duplex (TDD) operation with uplink-downlink configuration 0.

Downlink Assignment Index (DAI)—2 bits as defined in section 7.3 of R1-106557, Change Request for 3GPP Technical Specification No. 36.213, December 2010. This field is present only for TDD operation with uplink-downlink configurations 1-6.

CQI request—1 or 2 bits as defined in section 7.2.1 of R1-106557, Change Request for 3GPP Technical Specification No. 36.213, December 2010. The 2-bit field only applies to UEs that are configured with more than one DL cell.

SRS request—2 bits as defined in R1-106557, Change Request for 3GPP Technical Specification No. 36.213, December 2010.

Multi-cluster flag—1 bit as defined in R1-106557, Change Request for 3GPP Technical Specification No. 36.213, December 2010.

In addition, for transport block 1:

Modulation and coding scheme—5 bits as defined in section 7.1.7 of R1-106557, Change Request for 3GPP Technical Specification No. 36.213, December 2010.

New data indicator—1 bit.

In addition, for transport block 2:

Modulation and coding scheme—5 bits as defined in section 7.1.7 of R1-106557, Change Request for 3GPP Technical Specification No, 36.213, December 2010.

New data indicator—1 bit.

Precoding information and number of layers: number of bits as specified in Table 5.3.3.1.8-1. Bit field as shown in Table 5.3.3.1.8-2 and Table 5.3.3.1.8-3. If both transport blocks are enabled, transport block 1 is mapped to codeword 0, and transport block 2 is mapped to codeword 1. In the case in which one of the transport blocks is disabled, the transport block to codeword mapping is specified according to Table 5.3.3.1.5-2.

If the number of information bits in format 4 belongs to one of the sizes in Table 5.3.3.1.2-1, one zero bit is appended to format 4.

In DCI format 4, a transport block is disabled if either the combination of $I_{MCS}=0$ and $N_{PRB}>1$ or the combination of $I_{MCS}=28$ and $N_{PRB}=1$ is signaled. Otherwise, the transport block is enabled.

In embodiments of this disclosure, with regard to aperiodic channel state information (CSI) request signaling:

if carrier aggregation is configured, the aperiodic CSI request field contains 2 bits (1 bit is added to the DCI format in the UE-specific search space):

"00" state indicates no CSI is triggered,

"01" state indicates trigger for the downlink component carrier (DL CC) that is SIB2-linked to the uplink component carrier (UL CC) transmitting the CSI report, "10" meaning is configured by radio resource control (RRC), and "11" meaning is configured by RRC.

For the common search space:

"0" state indicates no CSI is triggered, and

"1" meaning is configured by RRC.

The RRC can configure any combination of up to 5 component carriers.

In embodiments of this disclosure, UCI-only reporting (or CQI-only reporting) on a PUSCH implies that a UE maps only UCI on the PUSCH. At the same time, the UE does not map any data transport block on the PUSCH. The UCI includes aperiodic CSI, rank information (RI), and Hybrid Automatic Repeat Request acknowledgement (HARQ-ACK) signaling.

In the below embodiments, the term TB disabling/enabling is used. In R1-106557, Change Request for 3GPP Technical Specification No. 36.213, December 2010, for example, TB disabling/enabled is defined as follows: "In DCI format 4, a transport block is disabled if either the combination of $I_{MCS}=0$ and $N_{PRB}>1$ or the combination of $I_{MCS}=28$ and $N_{PRB}=1$ is signaled. Otherwise, the transport block is enabled." In the case of UCI-only transmission, even if one TB is enabled on the PUSCH, no TBs are transmitted on the PUSCH and only UCI is transmitted.

In embodiments of this disclosure, when a UE receives a DCI format 4 scheduling a PUSCH, the UE determines UCI-only reporting if the following set of conditions are satisfied:

the transmission rank is equal to 1;

the modulation and coding scheme (MCS) of an enabled TB is 29, or the RV (redundancy version) is one;

the CSI request field is non-zero. If carrier aggregation is configured, this implies that CSI request field is 01, 10 or 11. If carrier aggregation is not configured, this implies that CSI request field is 1; and the $N_{PRB}$, i.e., the number of physical resource blocks (PRBs) allocated for the UE, is less than or equal to 4.

In Release 8 or 9, the CSI coded bits in a UCI only reporting is modulated only with a QPSK modulation scheme.

In particular embodiments, the UE determines that the transmission rank is one according to the following:

if the UE is configured to transmit up to 2 layers (or on 2 antenna ports) on the PUSCH, the UE determines that the transmission rank is one if only one TB is disabled; and if the UE is configured to transmit up to 4 layers (or on 4 antenna ports) on the PUSCH, the UE determines that the transmission rank is one if only one TB is disabled. At the same time, the precoder information field is one of 0, 1, 2, . . . , 23.

In the case of carrier aggregation, the number of CSI bits to be reported in the PUSCH is determined by the CSI request bit field, As an example, it is assumed that the UE is configured with 5 component carriers (CCs), or 5 serving cells, indexed by cell 0 (or the primary cell), cell 1, . . . , cell 4. It is further assumed that the states in the 2-bit CSI request field indicate CSI reporting methods as in Table 1 below.

TABLE 1

| Aperiodic CSI request field | CSI reporting method |
|---|---|
| 00 | No CSI is triggered. |
| 01 | CSI reporting is triggered for the DL CC that is SIB2-linked to the UL CC transmitting the CSI report. |

TABLE 1-continued

| Aperiodic CSI request field | CSI reporting method |
| --- | --- |
| 10 | CSI reporting is triggered for DL CC 0 and DL CC 1 (or cells 0 and 1). |
| 11 | CSI reporting is triggered for all configured DL CCs (or cells), i.e., cell 0, 1, 2, 3, 4. |

It is noted that the CSI reporting methods indicated by aperiodic CSI request field values 10 and 11 are configured by an RRC signaling. In this embodiment, when the aperiodic CSI request field value is 11, the UE has to report for all 5 DL CCs. As the number of CSI bits to be sent in the UCI-only reporting can be up to five times larger with carrier aggregation than without carrier aggregation, a method of ensuring a reliable transmission of the CSI is provided in this disclosure.

One method of ensuring the reliability of the CSI transmission when carrier aggregation is configured is to use a higher modulation for the CSI. When 16 QAM is used for modulating the CSI bits, the coding rate for the CSI will be reduced to half of the coding rate when QPSK is used for modulating CSI bits. For indicating a modulation format of the CSI in the CQI only reporting in DCI format 4, a few embodiments are provided below. In the embodiments below, it is assumed that only one TB is disabled. A disabled TB index is denoted by i, where i=either 1 or 2. The enabled TB index becomes 3-i. For example, if TB 1 is disabled, then TB (3-1), i.e. TB 2, is enabled.

In some embodiments, the new data indicator (NDI) bit of a disabled TB is used to indicate a modulation format of CSI. For example,

| NDI of the disabled TB ($NDI_i$) | Modulation order of the CSI $Q_m$ in the UCI-only reporting |
| --- | --- |
| 0 | 2 (QPSK) |
| 1 | 4 (16QAM) |

In DCI format 4, when only one TB is enabled, the NDI bit of a disabled TB does not convey any information. Hence, the NDI bit of a disabled TB can be used for other purposes, like indicating a modulation format of CSI.

In some embodiments, MCS 31 (or RV 3) is used to indicate 16 QAM. For example, the MCS of the CSI in the UCI-only reporting is determined as follows:

| MCS field of the enabled TB ($MCS_{3-i}$) | Modulation order of the CSI $Q_m$ in the UCI only reporting |
| --- | --- |
| 29 | 2 (QPSK) |
| 31 | 4 (16QAM) |

In a physical hybrid ARQ indicator channel (PHICH) triggered retransmission, RVs are used in the order of RV0, RV2 (MCS 30), RV3 (MCS 31), RV1 (MCS 29) in HARQ transmission rounds. This implies that RV1 will be used the least and RV3 will be used the second least. Therefore, using MCS 31 (or RV3) to indicate a UCI only request transmission is subject to fewer scheduling restrictions than the other MCS.

In some embodiments, the modulation format of the CSI is determined by at least one of the payload size and the number of DL CCs reported by the current CSI reporting.

The coding rate of the CSI is dependent on the number of CSI information bits to be transmitted in at most 4 RBs (as determined by the CSI-only reporting condition) and a modulation format. When the number of CSI bits is small enough, even QPSK can provide a sufficiently low coding rate to ensure a reliable transmission. On the other hand, when the number of CSI bits is large, 16 QAM will be needed to keep the coding rate low.

Therefore, in some embodiments, a threshold number, $T_{bits}$, of total CSI information bits is used to determine the modulation format for the CSI in the UCI-only reporting. If the total CSI information bits to be transmitted in the current UCI-only reporting is greater than or equal to $T_{bits}$, then 16 QAM is used. Otherwise, QPSK is used.

| Total number of CSI information bits to be transmitted on the PUSCH, $N_{total}$ | Modulation order of the CSI $Q_m$ in the UCI only reporting |
| --- | --- |
| If $N_{total} < T_{bits}$ | 2 (QPSK) |
| If $N_{total} \geq T_{bits}$ | 4 (16QAM) |

Note that the total number of CSI bits in the UCI only transmission is determined by both the number of DL CCs reported by the CSI report and the CSI feedback modes in the DL CCs currently being reported.

For example, it is assumed that the 2-bit CSI reporting field is RRC configured so that the states in the 2-bit CSI reporting field indicate the CSI reporting methods as in Table 1. It is further assumed that the PUSCH feedback modes are configured for DL CCs 0 and 1 so that the number of CSI information bits to feedback for the DL CCs 0 and 1 are N0=48 and N1=72, respectively. If the 2-bit CSI reporting field has a state "10", then the total number of CSI information bits to transmit on the PUSCH is Ntotal=48+72 =120. If it is further assumed that the threshold number of bits $N_{bits}$=100, then the modulation format for CSI will be 16 QAM according to this embodiment. If an UL grant triggers an aperiodic CSI reporting on the PUSCH in the UL CC 0 which is SIB-linked with the DL CC 0 and the 2-bit CSI reporting field in the UL grant has a state "01", then the UE would transmit a CSI report for the DL CC 0. Furthermore, as the number of CSI information bits is N0=48<$T_{bits}$=100 for the DL CC 0, the UE would use QPSK modulation for the CSI.

In some embodiments, a threshold number, e.g. $T_{CCs}$, of the number of DL CCs reported by the current UCI only reporting is used to determine the modulation format for the CSI in the UCI-only reporting. If the number of DL CCs reported in the current UCI-only reporting is greater than or equal to $T_{CCs}$, then 16 QAM is used. Otherwise, QPSK is used.

| Number of DL CCs reported on the PUSCH, $N_{CCs}$ | Modulation order of the CSI $Q_m$ in the UCI only reporting |
| --- | --- |
| If $N_{CCs} < T_{CCs}$ | 2 (QPSK) |
| If $N_{CCs} \geq T_{CCs}$ | 4 (16QAM) |

For example, it is assumed that the 2-bit CSI reporting field is RRC configured so that the states in the 2-bit CSI reporting field indicates CSI reporting methods as in Table 1. It is further assumed that $T_{CCs}$=3. If the 2-bit CSI reporting field has a state "01" (which indicates that the UE should report for 2 DL CCs, i.e., cells 0 and 1), then the modulation format for the CSI will be QPSK according to this embodiment. If the 2-bit CSI reporting field has a state "11" (which indicates that the UE should report for 5 DL CCs), then the modulation format for the CSI will be 16 QAM according to this embodiment. If an UL grant triggers an aperiodic CSI reporting on the PUSCH in the UL CC 0 which is SIB-linked with the DL CC 0 and the 2-bit CSI reporting field in the UL grant has a state "01", then the UE would transmit a CSI report for the DL CC 0. Furthermore, as the number of DL CCs reported in the current UCI-only reporting ($N_{CCs}$=1) is less than $T_{CCs}$=3, the UE would use QPSK modulation for the CSI.

In some embodiments, the modulation format of the CSI is RRC configured.

In some embodiments, the modulation format of the CSI is determined by a disabled TB index.

For example, if the TB1 is disabled, then QPSK is used. Otherwise, 16 QAM is used.

| Disabled TB index | Modulation order of the CSI $Q_m$ in the UCI only reporting |
|---|---|
| 1 | 2 (QPSK) |
| 2 | 4 (16QAM) |

In some embodiments of this disclosure, when a UE receives a DCI format 4 scheduling a PUSCH, the UE determines UCI-only reporting if the following set of conditions are satisfied:
- the transmission rank is equal to 1;
- the MCS of an enabled TB is 29, or the RV (redundancy version) is one;
- the CSI request field is non-zero. If carrier aggregation is configured, this implies that CSI request field is 01, 10 or 11. If carrier aggregation is not configured, this implies that CSI request field is 1; and
- the $N_{PRB}$, i.e., the number of PRBs allocated for the UE, is less than or equal to the threshold number of PRBs, i.e., $T_{PRB}$.

In some embodiments, the UE determines that the transmission rank is one according to the following:
- if the UE is configured to transmit up to 2 layers (or on 2 antenna ports) on PUSCH, the UE determines that the transmission rank is one if only one TB is disabled; and
- if the UE is configured to transmit up to 4 layers (or on 4 antenna ports) on PUSCH, the UE determines that the transmission rank is one if only one TB is disabled and at the same time the precoder information field is one of 0, 1, 2, ... , 23.

As the threshold number of PRBs, i.e., $T_{PRB}$, indicating the UCI-only reporting is increased, the CSI coding rate can be decreased, which will be useful to ensure a reliable transmission of the CSI in the case of carrier aggregation. When $T_{PRB}$=8, the maximum coding rate for the CSI will be reduced to half of the maximum coding rate when $T_{PRB}$=4. For indicating the threshold number of PRBs, i.e., the $T_{PRB}$, in the CQI only reporting in DCI format 4, this disclosure provides the embodiments below. In the embodiments below, assuming that only one TB is disabled, a disabled TB index is denoted by i, where i=either 1 or 2. The enabled TB index becomes 3-i. For example, if TB 1 is disabled, TB (3-1), i.e., TB 2 is enabled.

In some embodiments, the NDI bit of a disabled TB is used to indicate the threshold number of PRBs, i.e., the $T_{PRB}$. For example:

| NDI of the disabled TB ($NDI_i$) | Threshold number of PRBs, $T_{PRB}$ |
|---|---|
| 0 | 4 |
| 1 | 8 |

In some embodiments, MCS 31 (or RV 3) is used to indicate $T_{PRB}$=8. For example, the threshold number of PRBs, $T_{PRB}$, in the UCI-only reporting is determined as follows:

| MCS field of the enabled TB ($MCS_{3-i}$) | Threshold number of PRBs, $T_{PRB}$ |
|---|---|
| 29 | 4 |
| 31 | 8 |

In some embodiments, the threshold number of PRBs, $T_{PRB}$, is determined by at least one of the payload size and the number of DL CCs reported in the current CSI reporting.

In some embodiments, a threshold number, e.g. $T_{bits}$, of total CSI information bits is used to determine the threshold number of PRBs, $T_{PRB}$, in the UCI-only reporting. If the total CSI information bits to be transmitted in the current UCI-only reporting is less than $T_{bits}$, then $T_{PRB}$=4. Otherwise, $T_{PRB}$ is greater than 4. In one example, if the total CSI information bits to be transmitted in the current UCI-only reporting is less than then $T_{PRB}$=4. Otherwise, $T_{PRB}$=8.

| Total number of CSI information bits to be transmitted on the PUSCH, $N_{total}$ | Threshold number of PRBs, $T_{PRB}$ |
|---|---|
| If $N_{total} < T_{bits}$ | 4 |
| If $N_{total} \geq T_{bits}$ | 8 |

In another example, if the total CSI information bits to be transmitted in the current UCI-only reporting is less than $T_{bits}$, then $T_{PRB}$=4. Otherwise, $T_{PRB}$=20.

| Total number of CSI information bits to be transmitted on the PUSCH, $N_{total}$ | Threshold number of PRBs, $T_{PRB}$ |
|---|---|
| If $N_{total} < T_{bits}$ | 4 |
| If $N_{total} \geq T_{bits}$ | 20 |

In some embodiments, a threshold number, e.g., $T_{CCs}$, of the number of DL CCs reported in the current UCI only reporting is used to determine the threshold number of PRBs, $T_{PRB}$, in the UCI-only reporting. If the number of DL CCs reported in the current UCI-only reporting is less than $T_{CCs}$, then $T_{PRB}$=4. Otherwise, $T_{PRB}$ is greater than 4. In one example, if the number of DL CCs reported in the current UCI-only reporting is less than $T_{CCs}$, then $T_{PRB}$=4. Otherwise, $T_{PRB}$=8. In particular embodiments, $T_{CCs}$ is 2.

| Number of DL CCs reported on the PUSCH, $N_{CCS}$ | Threshold number of PRBs, $T_{PRB}$ |
|---|---|
| If $N_{CCs} < T_{CCs}$ | 4 |
| If $N_{CCs} \geq T_{CCs}$ | 8 |

In another example, if the number of DL CCs reported in the current UCI-only reporting is less than $T_{CCs}$, then $T_{PRB}$=4. Otherwise, $T_{PRB}$=20. In particular embodiments, $T_{CCs}$ is 2.

| Number of DL CCs reported on the PUSCH, $N_{CCs}$ | Threshold number of PRBs, $T_{PRB}$ |
| --- | --- |
| If $N_{CCs} < T_{CCs}$ | 4 |
| If $N_{CCs} \geq T_{CCs}$ | 20 |

In some embodiments, the threshold number of PRBs, $T_{PRB}$, is RRC configured.

In some embodiments, the threshold number of PRBs, $T_{PRB}$, is determined by a disabled TB index as indicated by the table below.

For example, if TB1 is disabled, then QPSK is used. Otherwise, 16 QAM is used.

| Disabled TB index | Threshold number of PRBs, $T_{PRB}$ |
| --- | --- |
| 1 | 4 |
| 2 | 8 |

In some embodiments of this disclosure, when a UE receives a DCI format 4 scheduling a PUSCH, the UE determines UCI-only reporting if the following set of conditions are satisfied:
  the transmission rank is equal to 1;
  the MCS of an enabled TB is 29, or RV (redundancy version) is one;
  the CSI request field is non-zero. If carrier aggregation is configured, this implies that CSI request field is 01, 10 or 11. If carrier aggregation is not configured, this implies that CSI request field is 1; and
  the $N_{PRB}$, i.e., the number of PRBs allocated for the UE, is less than or equal to $T_{PRB}$.

In this embodiment, the modulation format used for CSI modulation can be determined by any of the embodiments provided in this disclosure, and the $T_{PRB}$ can be determined by any of the embodiments provided in this disclosure.

In one example, CSI modulation format is indicated by the NDI bit of the disabled TB, while the $T_{PRB}$ is determined by a disabled TB index as shown in the following tables:

| NDI of the disabled TB ($NDI_i$) | Modulation order of the CSI $Q_m$ in the UCI-only reporting |
| --- | --- |
| 0 | 2 (QPSK) |
| 1 | 4 (16QAM) |

| Disabled TB index | Threshold number of PRBs, $T_{PRB}$ |
| --- | --- |
| 1 | 4 |
| 2 | 8 |

In another example, the CSI modulation format and the $T_{PRB}$ are jointly indicated by one codepoint, e.g., the NDI of a disabled TB, as shown in the following tables:

| NDI of the disabled TB ($NDI_i$) | Modulation order of the CSI $Q_m$ in the UCI-only reporting | Threshold number of PRBs, $T_{PRB}$ |
| --- | --- | --- |
| 0 | 2 (QPSK) | 4 |
| 1 | 4 (16QAM) | 8 |

In some embodiments of this disclosure, when a UE is receiving a DCI format 0/0A scheduling a PUSCH, the UE determines UCI-only reporting if the following set of conditions are satisfied:
  the MCS is 29, or RV (redundancy version) is one;
  the CSI request field is non-zero. If carrier aggregation is configured and the DCI is transmitted in a UE-specific search space, this implies that CSI request field is 01, 10 or 11. If carrier aggregation is not configured or if the DCI is transmitted in a cell-specific search space, this implies that CSI request field is 1; and
  the $N_{PRB}$, i.e., the number of PRBs allocated for the UE, is less than or equal to $T_{PRB}$.

In some embodiments of this disclosure, when a UE is receiving a DCI format 4 scheduling a PUSCH, the UE determines UCI-only reporting if the following set of conditions are satisfied:
  the transmission rank is equal to 1;
  the CSI request field is non-zero. If carrier aggregation is configured, this implies that CSI request field is 01, 10 or 11. If carrier aggregation is not configured, this implies that CSI request field is 1; and
  the NDI bit of the disabled TB is 1.

In DCI format 4, when only one CW is enabled, the NDI bit of a disabled TB does not convey any information. Hence, the NDI bit of a disabled TB can be used for other purposes, such as indicating the UCI-only transmission. In a sense, this method is a simpler method than the other embodiments, as the number of conditions to be met for determining a UCI-only transmission is smaller. Another benefit is that the UCI-only transmission is no longer limited within a PUSCH with a small number of RB allocation (e.g., up to 4 RBs).

Assuming that only one TB is disabled, a disabled TB index is denoted by i, where i=either 1 or 2. The enabled TB index becomes 3-i.

The UE determines that the transmission rank is one according to the following:
  if the UE is configured to transmit up to 2 layers (or on 2 antenna ports) on the PUSCH, the UE determines that the transmission rank is one if only one TB is disabled; and
  if the UE is configured to transmit up to 4 layers (or on 4 antenna ports) on PUSCH, the UE determines that the transmission rank is one if only one TB is disabled and at the same time the precoder information field is one of 0, 1, 2, . . . , 23.

To indicate the modulation format of the CSI in the UCI-only transmission, any of the embodiments provided in this disclosure may be used. Furthermore, the embodiments described below may be used to indicate the modulation format.

The MCS field of the enabled TB indicates a modulation format for the CSI in the UCI-only transmission.

In one example, the modulation order of the CSI is determined as in the following table:

| MCS field of the enabled TB ($MCS_{3-i}$) | Modulation order of the CSI $Q_m$ in the UCI only reporting |
| --- | --- |
| 0 | 2 (QPSK) |
| 1 | 4 (16QAM) |
| 2 through 31 | Reserved |

In another example, the modulation order of the CSI is determined by the modulation order indicated by the MCS field to Table 8.6.1-1 in R1-106557, Change Request for 3GPP Technical Specification No. 36.213, December 2010. In other words, the modulation order of the CSI is determined as in the following table:

| MCS field of the enabled TB ($MCS_{3-i}$) | Modulation order of the CSI $Q_m$ in the UCI only reporting |
|---|---|
| 0 through 10 | 2 (QPSK) |
| 11 through 20 | 4 (16QAM) |
| 21 through 31 | Reserved |

In another example, one bit of the 5-bit MCS field of the enabled TB indicates the modulation order. If the most significant bit (MSB) of the 5-bit MCS field of the enabled TB is used for indicating the modulation order, the following table is used:

| MSB of the 5-bit MCS field of the enabled TB ($MCS_{3-i}$) | Modulation order of the CSI $Q_m$ in the UCI only reporting |
|---|---|
| 0 | 2 (QPSK) |
| 1 | 4 (16QAM) |

Furthermore, the MCS field of the enabled TB may be used to jointly indicate the UCI contents to be reported in the current UCI-only reporting and the modulation format. Here, UCI contents include the number and the identities of the DL CCs (or serving cells) reported in the current UCI-only reporting, how many HARQ-ACK bits and how many RI bits should be piggybacked in the current UCI-only reporting, and so on.

In one example, the MCS field of the enabled TB indicates the UCI contents and the modulation order as in the following:

| MCS field of the enabled TB ($MCS_{3-i}$) | Modulation order of the CSI $Q_m$ in the UCI only reporting | UCI contents |
|---|---|---|
| 0 | 2 (QPSK) | CSI reporting is triggered for the DL CC that is SIB2-linked to the UL CC transmitting the CSI report. |
| 1 | 2 (QPSK) | CSI reporting is triggered for all configured DL CCs. |
| 2 | 4 (16QAM) | CSI reporting is triggered for the DL CC that is SIB2-linked to the UL CC transmitting the CSI report. |
| 3 | 4 (16QAM) | CSI reporting is triggered for all configured DL CCs. |
| 4 through 31 | Reserved | Reserved |

In another example, one bit of the 5-bit MCS field of the enabled TB indicates the modulation order, while another bit of the 5-bit MCS field of the enabled TB indicates the UCI contents. If the MSB of the 5-bit MCS field of the enabled TB is used for indicating the modulation order and the 2nd MSB of the 5-bit MCS field of the enabled TB is used for indicating the UCI contents, the following table for the modulation order indication is used:

| MSB of the 5-bit MCS field of the enabled TB ($MCS_{3-i}$) | Modulation order of the CSI $Q_m$ in the UCI only reporting |
|---|---|
| 0 | 2 (QPSK) |
| 1 | 4 (16QAM) | and the following table for indicating the UCI contents:

| $2^{nd}$ MSB of the 5-bit MCS field of the enabled TB ($MCS_{3-i}$) | UCI contents |
|---|---|
| 0 | CSI reporting is triggered for the DL CC that is SIB2-linked to the UL CC transmitting the CSI report. |
| 1 | CSI reporting is triggered for all configured DL CCs. |

In some embodiments of this disclosure, when a UE is receiving a DCI format 4 scheduling a PUSCH, the UE determines UCI-only reporting if the following set of conditions are satisfied:
the transmission rank is equal to 1;
the CSI request field is non-zero. If carrier aggregation is configured, this implies that CSI request field is 01, 10 or 11. If carrier aggregation is not configured, this implies that CSI request field is 1;
the NDI bit of the disabled TB is 1; and
the $N_{PRB}$, i.e., the number of PRBs allocated for the UE, is less than or equal to $T_{PRB}$.

In DCI format 4, when only one CW is enabled, the NDI bit of a disabled TB does not convey any information. Hence, the NDI bit of a disabled TB can be used for other purposes, like indicating the UCI-only transmission. In a sense, this method is a simpler method than the other embodiments, as the number of conditions to be met for finding out a UCS-only transmission is smaller. Another benefit is that the UCI-only transmission is no longer limited within a PUSCH with a small number of RB allocation (e.g., up to 4 RBs), Assuming that only one TB is disabled, a disabled TB index is denoted by i, where i=either 1 or 2. The enabled TB index becomes 3-i. In this embodiment, the NDI of the disabled TB will indicate a state as in the following table:

| NDI of the disabled TB ($NDI_i$) | State indicated |
|---|---|
| 0 | Single-TB transmission |
| 1 | UCI-only transmission |

In some embodiments, the UE determines that the transmission rank is one according to the following:
if the UE is configured to transmit up to 2 layers (or on 2 antenna ports) on the PUSCH, the UE determines that the transmission rank is one if only one TB is disabled; and
if the UE is configured to transmit up to 4 layers (or on 4 antenna ports) on the PUSCH, the UE determines that the transmission rank is one if only one TB is disabled and at the same time the precoder information field is one of 0, 1, 2, . . . , 23.

To indicate the modulation format of the CSI in the UCI-only transmission, any of the above described embodiments may be used.

Furthermore, the MCS field of the enabled TB may be used to jointly indicate the UCI contents reported in the current UCI-only reporting, the modulation format and the threshold number of PRBs, i.e., $T_{PRB}$. Here, the UCI contents include the number and the identities of the DL CCs (or serving cells) to be reported in the current UCI-only reporting, how many HARQ-ACK bits and how many RI bits should be piggybacked in the current UCI-only reporting, and so on.

In one example, the MCS field of the enabled TB indicates UCI contents as in the following:

| MCS field of the enabled TB ($MCS_{3-i}$) | Modulation order of the CSI $Q_m$ in the UCI only reporting | Threshold number of PRBs, $T_{PRB}$ | UCI contents |
|---|---|---|---|
| 0 | 2 (QPSK) | 4 | CSI reporting is triggered for the DL CC that is SIB2-linked to the UL CC transmitting the CSI report. |
| 1 | 2 (QPSK) | 4 | CSI reporting is triggered for all configured DL CCs. |
| 2 | 4 (16QAM) | 4 | CSI reporting is triggered for the DL CC that is SIB2-linked to the UL CC transmitting the CSI report. |
| 3 | 4 (16QAM) | 4 | CSI reporting is triggered for all configured DL CCs. |
| 4 | 2 (QPSK) | 8 | CSI reporting is triggered for the DL CC that is SIB2-linked to the UL CC transmitting the CSI report. |
| 5 | 2 (QPSK) | 8 | CSI reporting is triggered for all configured DL CCs. |
| 6 | 4 (16QAM) | 8 | CSI reporting is triggered for the DL CC that is SIB2-linked to the UL CC transmitting the CSI report. |
| 7 | 4 (16QAM) | 8 | CSI reporting is triggered for all configured DL CCs. |
| 8 through 31 | reserved | reserved | reserved |

In another example, one bit of the 5-bit MCS field of the enabled TB indicates the modulation order, while another bit of the 5-bit MCS field of the enabled TB indicates the DCI contents and a still other bit of the 5-bit MCS field of the enabled TB indicates the threshold number of PRBs $T_{PRB}$. If the MSB of the 5-bit MCS field of the enabled TB is used for indicating the modulation order, the 2nd MSB of the 5-bit MCS field of the enabled TB is used for indicating the UCI contents, and the 3rd MSB of the 5-bit MCS field of the enabled TB is used for indicating threshold number of PRBs $T_{PRB}$, then the following table is used for the modulation order indication:

| MSB of the 5-bit MCS field of the enabled TB ($MCS_{3-i}$) | Modulation order of the CSI $Q_m$ in the UCI only reporting |
|---|---|
| 0 | 2 (QPSK) |
| 1 | 4 (16QAM) | the following table for indicating the UCI contents:

| $2^{nd}$ MSB of the 5-bit MCS field of the enabled TB ($MCS_{3-i}$) | UCI contents |
|---|---|
| 0 | CSI reporting is triggered for the DL CC that is SIB2-linked to the UL CC transmitting the CSI report. |
| 1 | CSI reporting is triggered for all configured DL CCs. | and the following table for indicating the threshold number of PRBs $T_{PRB}$:

| $3^{rd}$ MSB of the 5-bit MCS field of the enabled TB ($MCS_{3-i}$) | Threshold number of PRBs, $T_{PRB}$ |
|---|---|
| 0 | 4 |
| 1 | 8 |

In some embodiments of this disclosure, when a UE receives a DCI format 4 scheduling a PUSCH, the UE determines UCI-only reporting if the following set of conditions are satisfied:

both TBs are disabled; and the CSI request field is non-zero. If carrier aggregation is configured, this implies that CSI request field is 01, 10 or 11. If carrier aggregation is not configured, this implies that CSI request field is 1.

In this embodiment, one CW (e.g., CW0) is enabled to carry UCI on the enabled CW even if both TBs are disabled. Hence, the UE reads a column for one enabled CW in the transmitted precoding matrix indicator (TPMI) tables 5.3.3.1.8-2 and 5.3.3,1.8-3 in R1-106557, Change Request for 3GPP Technical Specification No. 36.213, December 2010, for example, to determine a TPMI from the precoder information field.

The modulation format used for CSI modulation can be determined by any of the embodiments provided in this disclosure, and the $T_{PRB}$ can be determined by any of the embodiments provided in this disclosure.

Furthermore, as both TBs are disabled, both NDI bits do not convey any information. Hence, one NDI bit can be used to indicate the CSI modulation format.

In one example, NDI1 indicate the CSI modulation format as follows:

| NDI of the TB1 ($NDI_1$) | Modulation order of the CSI $Q_m$ in the UCI only reporting |
|---|---|
| 0 | 2 (QPSK) |
| 1 | 4 (16QAM) |

In some embodiments of this disclosure, when a UE receives a DCI format 4 scheduling a PUSCH, the UE determines UCI-only reporting if the following set of conditions are satisfied:

both TBs are disabled;
the transmission rank is one; and
the CSI request field is non-zero. If carrier aggregation is configured, this implies that CSI request field is 01, 10 or 11. If carrier aggregation is not configured, this implies that CSI request field is 1.

In this embodiment, one CW (e.g., CW0) is enabled to carry UCI on the enabled CW even if both TBs are disabled. Hence, the UE reads a column for one enabled CW in the transmitted precoding matrix indicator (TPMI) tables 5.3.3.1.8-2 and 5.3.3.1.8-3 in R1-106557, Change Request for 3GPP Technical Specification No. 36.213, December 2010, for example, to determine a TPMI from the precoder information field.

In some embodiments of this disclosure, the UE determines that the transmission rank is one according to the following:
  if the UE is configured to transmit up to 2 layers (or on 2 antenna ports) on the PUSCH, the UE determines that the transmission rank is one if only one TB is disabled; and
  if the UE is configured to transmit up to 4 layers (or on 4 antenna ports) on the PUSCH, the UE determines that the transmission rank is one if only one TB is disabled and at the same time the precoder information field is one of 0, 1, 2, . . . , 23.

In some embodiments of this disclosure, when a UE receives a DCI format 4 scheduling a PUSCH, the UE determines UCI-only reporting if the following set of conditions are satisfied:
  both TBs are disabled;
  the CSI request field is non-zero. If carrier aggregation is configured, this implies that CSI request field is 01, 10 or 11. If carrier aggregation is not configured, this implies that CSI request field is 1; and
  the $N_{PRB}$, i.e., the number of PRBs allocated for the UE, is less than or equal to $T_{PRB}$.

In this embodiment, one CW (e.g., CW0) is enabled to carry UCI on the enabled CW even if both TBs are disabled. Hence, the UE reads a column for one enabled CW in the transmitted precoding matrix indicator (TPMI) tables 5.3.3.1.8-2 and 5.3.3.1.8-3 in R1-106557, Change Request for 3GPP Technical Specification No. 36.213, December 2010, for example, to determine a TPMI from the precoder information field.

The modulation format used for the CSI modulation can be determined by any of the embodiments provided in this disclosure, and the $T_{PRB}$ can be determined by any of the embodiments provided in this disclosure.

Furthermore, as both TBs are disabled, both NDI bits do not convey any information. Hence, one NDI bit can be used to indicate the CSI modulation format, while the other NDI bit can be used to indicate the threshold number of RBs.

In one example, NDI1 indicates the CSI modulation format as follows:

| NDI of the disabled TB ($NDI_1$) | Modulation order of the CSI $Q_m$ in the UCI only reporting |
| --- | --- |
| 0 | 2 (QPSK) |
| 1 | 4 (16QAM) |

At the same time, NDI2 indicates the threshold number of PRBs as follows:

| NDI of the disabled TB ($NDI_2$) | Threshold number of PRBs, $T_{PRB}$ |
| --- | --- |
| 0 | 4 |
| 1 | 8 |

In some embodiments of this disclosure, when a UE receives a DCI format 4 scheduling a PUSCH, the UE determines UCI-only reporting if the following set of conditions are satisfied:
  TB1 is disabled and the transmission rank is equal to 1;
  the MCS of TB2 (i.e., the MCS of the enabled TB) is 29, or the RV (redundancy version) is one;
  the CSI request field is non-zero. If carrier aggregation is configured, this implies that CSI request field is 01, 10 or 11. If carrier aggregation is not configured, this implies that CSI request field is 1; and
  the $N_{PRB}$, i.e., the number of PRBs allocated for the UE, is less than or equal to 4.

In some embodiments, the UE determines that the transmission rank is one according to the following:
  if the UE is configured to transmit up to 2 layers (or on 2 antenna ports) on the PUSCH, the UE determines that the transmission rank is one if only one TB is disabled; and
  if the UE is configured to transmit up to 4 layers (or on 4 antenna ports) on the PUSCH, the UE determines that the transmission rank is one, if only one TB is disabled and at the same time the precoder information field is one of 0, 1, 2, . . . , 23.

The modulation format used for the CSI modulation can be determined by any of the embodiments provided in this disclosure, and the $T_{PRB}$ can be determined by of the embodiments provided in this disclosure.

In embodiments of this disclosure, when a UE receives a DCI format 4 scheduling a PUSCH, the UE determines UCI-only reporting if the following set of conditions are satisfied:
  TB2 is disabled and the transmission rank is equal to 1;
  the MCS of TB1 (i.e., MCS of the enabled TB) is 29, or RV (redundancy version) is one;
  the CSI request field is non-zero. If carrier aggregation is configured, this implies that CSI request field is 01, 10 or 11. If carrier aggregation is not configured, this implies that CSI request field is 1; and
  the $N_{PRB}$, i.e., the number of PRBs allocated for the UE, is less than or equal to 4.

In some embodiments, the UE determines that the transmission rank is one according to the following:
  if the UE is configured to transmit up to 2 layers (or on 2 antenna ports) on the PUSCH, the UE determines that the transmission rank is one if only one TB is disabled; and
  if the UE is configured to transmit up to 4 layers (or on 4 antenna ports) on the PUSCH, the UE determines that the transmission rank is one if only one TB is disabled and at the same time the precoder information field is one of 0, 1, 2, . . . , 23.

The modulation format used for the CSI modulation can be determined by any of the embodiments provided in this disclosure, and the $T_{PRB}$ can be determined by any of the embodiments provided in this disclosure.

In some embodiments of this disclosure, the modulation format of the CSI in UCI-only transmission is determined by which DCI format triggers a UCI only transmission. For example, when DCI format 0/0A triggers UCI-only transmission, QPSK is used for the modulation format of the UCI.

When DCI format 4 triggers UCI-only transmission, 16QAM is used for the modulation format of UCI as shown in the following table:

| DCI format triggering a UCI only transmission | Modulation order of the CSI $Q_m$ in the UCI only reporting |
|---|---|
| DCI format 0/0A (SIMO DCI format) | 2 (QPSK) |
| DCI format 4 (MIMO DCI format) | 4 (16QAM) |

In some embodiments of this disclosure, CQI/PMI is mapped/allocated onto a subset of the Ns layers being transmitted on the uplink in a MIMO uplink subframe. The size of the subset, Ns, could be less than or equal to the total number of layers, which is denoted by N.

This subset of layers could be implicitly inferred by the UE according to (1) the number of codewords; (2) the codeword to layer mapping structure; and (3) the codeword that uses highest initial-transmission MCS value. For example, if N=4 and layers 1,2 are used for codeword 1 transmission while layers 3,4 are used for codeword 2 transmission, and if the MCS used for TB1 in the TB1's initial transmission, $I_{MCS,initial}^{(1)}$, is greater than the MCS used for TB2's initial transmission, $I_{MCS,initial}^{(2)}$, then the UE can decide to transmit UL control information (UCI) on layers 1 and 2, which correspond to the layers with the better initial MCS.

In some embodiments, the initial-transmission MCSs $I_{MCS,initial}^{(1)}$ and $I_{MCS,initial}^{(2)}$ for the two TBs (CWs) are determined according to the following procedure:

The UE reads the MCS1 $I_{MCS}^{(1)}$ in DCI 0B. If TB1 is to be transmitted for the first time, i.e., if $I_{MCS}^{(1)}<29$, then the UE sets the initial-transmission MCS for TB1, $I_{MCS,initial}^{(1)}=I_{MCS}^{(1)}$. Otherwise, i.e., if $I_{MCS}^{(1)}\geq 29$, then the UE determines the initial-transmission MCS for TB1, $I_{MCS,initial}^{(1)}$, from the DCI transported in the latest PDCCH for TB1 using $I_{MCS}^{(1)}<29$.

The UE reads the MCS2 $I_{MCS}^{(2)}$ DCI 0B. If TB2 is to be transmitted for the first time, i.e., $I_{MCS}^{(2)}<29$, then the UE sets the initial-transmission MCS for TB2, $I_{MCS,initial}^{(2)}=I_{MCS}^{(2)}$. Otherwise, i.e., if $I_{MCS}^{(2)}\geq 29$, then the UE determines the initial-transmission MCS for TB2, $I_{MCS,initial}^{(2)}$, from the DCI transported in the latest PDCCH for TB2 using $I_{MCS,initial}^{(2)}<29$.

Therefore, for one CW transmission, the UCI is mapped onto the layers of that CW. For two CWs transmission with different MCS values indicated by the UL grant, the UCI is mapped onto the layers of the CW with the higher initial MCS value.

In addition, for the case of two codewords having the same the same MCS, the following approaches are provided:

Method 1: the UE always maps the UCI on CW0 (codeword0, or the first codeword), which is mapped to either layer 0 or layers and 1, according to the CW to layer mapping table, and transmission rank.

Method 2: the UE always maps the UCI on CW1 (codeword1, or the second codeword).

Method 3: the UE maps the UCI on CW1 (the second codeword) for the case of rank 3 (3 layers) transmission, and maps UCI on CW0 for other rank transmissions. The reason for the special treatment for rank 3 is that in rank3, CW0 is mapped to layer0, and CW1 is mapped to layers 1 and 2. Therefore, it may be better to map UCI to the CW with 2-layer transmission since this provides more resources for UCI transmission.

In this disclosure, for ease of description, CQI-only request signaling methods using one example design of a UL MIMO SM DCI format, namely DCI format 0B, are described. However, one of ordinary skill in the art would recognize that the signaling methods provided in this disclosure can be applied to other designs of DCI format 0B as well without departing from the scope or spirit of this disclosure.

When a CQI-only request is signaled to a UE, the UE does not transmit TB for the UL-SCH in a CW that will carry CQI/PMI, and the UE transmits only UCI (without UL data) in the CW.

DCI format 0B includes the following IEs:
PMI/RI—1 bit for 2-Tx UE, and 5 bits for 4-Tx UE,
NDI1—1 bit,
MCS1 IE for CW0, $I_{MCS}^{(1)}$—5 bits,
NDI2—1 bit, and
MCS2 IE for CW1, $I_{MCS}^{(2)}$—5 bits.

In Rel-10 LTE-A, the number of CQI/PMI information bits to be transmitted in a subframe can be significantly larger than that of Rel-8/9 LTE, when carrier aggregation and enhanced MIMO CQI/PMI feedback are considered. To increase spectral efficiency of UCI-only transmissions, two options can be considered.

Option 1: Allow higher-order modulations for UCI-only transmissions.

Option 2: Allow multi-CW transmissions for UCI-only transmissions.

In some embodiments of this disclosure, CQI-only request in LTE-A is indicated to a UE when IEs in DCI 0B intended for the UE satisfy the following three conditions:

Condition 1: At least one MCS IE is 29 (i.e., either $I_{MCS}^{(1)}=29$ or $I_{MCS}^{(2)}=29$ or both $I_{MCS}^{(1)}=I_{MCS}^{(2)}=29$), Condition 2: CQI request=1, and Condition 3: $N_{PRB} \leq P_{PRB}$.

The number of information bits carried in a CQI report can depend on the number of DL CCs reported by the CQI report. Hence, the threshold number of the PRBs, $T_{PRB}$, indicating the CQI-only report may need to be adapted according to the number of DL CCs. In addition, a number of coded bits in a CQI only report depend on a modulation order and a number of layers used for the CQI-only report.

In some embodiments of this disclosure, the threshold number of the PRBs, $T_{PRB}$, in Condition 3 is defined as a function of at least one of a number of DL CCs reported by a CQI report, $N_{DLCC}$, a modulation order $Q_m \in \{2,4,6\}$ and a number of layers on which a CQI report is transmitted, $L_{CQI}$. Some examples are listed below:

$T_{PRB}=4N_{DLCC}/(Q_m/2)/L_{CQI}$, $T_{PRB}=4N_{DLCC}$, $T_{PRB}=4N_{DLCC}/(Q_m/2)$, and $T_{PRB}=4N_{DLCC}/L_{CQI}$.

In some embodiments of this disclosure, when a UE receives a DCI 0B indicating 1 CW transmission in a subframe with CQI request=1, CQI/PMI is transmitted in the first CW, CW0. On the other hand, when a UE receives a DCI 0B indicating 2 CW transmission in a subframe with CQI request=1, a UE needs to identify a CW to transmit CQI. The following describes methods of indicating a CW to transmit CQI to a UE in case of 2 CW transmissions.

When a UE receives a DCI 0B indicating a 2 CW (TB) transmission in a subframe and CQI request=1 in the DCI 0B, the UE transmits CQI/PMI in one of the CW, according to the method below.

First, the UE determines the initial-transmission MCS $I_{MCS,initial}^{(1)}$ and $I_{MCS,initial}^{(2)}$ for the two TBs (CWs) according to the procedure described in embodiment 1:

If $N_{PRB} > T_{PRB}$, then a CW to carry CQI/PMI is determined by comparing the two MCSs used for the initial transmission of the two TBs (or the two CWs). When the two MCSs are different, a CW having a higher initial-transmission MCS carries the CQI/PMI. When the two MCSs are the same, CW0 carries the CQI/PMI. This operation can be done at the UE as in the following:

Considering the case where TB1 is transmitted in CW0 and TB2 is transmitted in CW1, if $I_{MCS,initial}^{(1)} \geq I_{MCS,initial}^{(2)}$, then CQI/PMI is transmitted in CW0. If $I_{MCS,initial}^{(1)} < I_{MCS,initial}^{(2)}$, then CQI/PMI is transmitted in CW1.

Considering the case where TB1 is transmitted in CW1 and TB2 is transmitted in CW0. If $I_{MCS,initial}^{(1)} \leq I_{MCS,initial}^{(2)}$, then CQI/PMI is transmitted in CW0. If $I_{MCS,initial}^{(1)} > I_{MCS,initial}^{(2)}$, then CQI/PMI is transmitted in CW1.

If $N_{PRB} \geq T_{PRB}$, then a CW to carry CQI/PMI is determined depending on whether at least one of $I_{MCS}^{(1)}$ and $I_{MCS}^{(2)}$ is 29 or not.

If neither $I_{MCS}^{(1)}$ or $I_{MCS}^{(2)}$ is 29, then CQI/PMI is transmitted in a CW with a higher initial-transmission MCS.

Considering the case where TB1 is transmitted in CW0 and TB2 is transmitted in CW1, if $I_{MCS,initial}^{(1)} \geq I_{MCS,initial}^{(2)}$, then the CQI/PMI is transmitted in CW0. If $I_{MCS,initial}^{(1)} < I_{MCS,initial}^{(2)}$, then the CQI/PMI is transmitted in CW1.

Considering the case where TB1 is transmitted in CW1 and TB2 is transmitted in CW0, if $I_{MCS,initial}^{(1)} \leq I_{MCS,initial}^{(2)}$, then the CQI/PMI is transmitted in CW0. If $I_{MCS,initial}^{(1)} > I_{MCS,initial}^{(2)}$, then the CQI/PMI is transmitted in CW1.

If either $I_{MCS}^{(1)}$ or $I_{MCS}^{(2)}$ is 29, then the CQI/PMI is transmitted in a CW having MCS IE index 29.

Considering the case where TB1 is transmitted in CW0 and TB2 is transmitted in CW1, if $I_{MCS}^{(1)} = 29$ and $I_{MCS}^{(2)} \neq 29$, then the CQI/PMI is transmitted in CW0. If $I_{MCS}^{(1)} \neq 29$ and $I_{MCS}^{(2)} = 29$, then the CQI/PMI is transmitted in CW1.

Considering the case where TB1 is transmitted in CW1 and TB2 is transmitted in CW2, if $I_{MCS}^{(1)} = 29$ and $I_{MCS}^{(2)} \neq 29$, then the CQI/PMI is transmitted in CW1. If $I_{MCS}^{(1)} \neq 29$ and $I_{MCS}^{(2)} = 29$, then the CQI/PMI is transmitted in CW0.

If both $I_{MCS}^{(1)}$ and $I_{MCS}^{(2)}$ are 29, then a few options for carrying CQI/PMI are provided by this disclosure.

Option 1: CQI/PMI is transmitted in one fixed CW, e.g., CW0. In the other CW not carrying CQI/PMI, a UL data (or a TB) is transmitted with a redundancy version (RV)=1 with a MCS IE index 29.

Option 2: CQI/PMI is transmitted in both CWs, where CQI/PMI information bits are separately encoded and mapped for the two CWs.

Option 3: CQI/PMI is transmitted in both CWs, where CQI/PMI modulation symbols are split into the layers of the two CWs.

It is possible to have a higher layer configuration to switch between these three options for mappings. In the following embodiments, for ease of description, Option 1 immediately above is used as an example to illustrate how this modulation format is indicated by DCI format 0B.

In some embodiments of this disclosure, when a UE receives a DCI 0B indicating a CQI-only request, i.e., when Conditions 1, 2 and 3 are satisfied ($N_{PRB} \leq T_{PRB}$, CQI request=1, and at least one MCS index is 29), the modulation order of the CQI/PMI is determined by the CSI IE of the DCI format. If the CSI value belongs to subset 1, one modulation order is indicated. If the CIS value belongs to subset 2, another modulation order is indicated for Option 1 immediately above, for example, as shown in the table below:

| CSI value belonging to | Modulation order of the CQI/PMI $Q_m$ |
|---|---|
| Subset 1 (e.g., {0, 1, 2, 3}) | 2 |
| Subset 2 (e.g., {4, 5, 6, 7}) | 4 |

In one embodiment of this disclosure, when a UE receives a DCI 0B indicating a CQI-only request, i.e., when Conditions 1, 2 and 3 are satisfied ($N_{PRB} \leq R_{PRB}$, CQI request=1, and at least one MCS index is 29), the modulation order of the CQI/PMI is determined by the following rules:

If DCI format 0B indicates that only 1 TB (CW) is enabled (although no data TB is transmitted, and only UCI is transmitted in this CW), the NDI bit of the enabled TB is used to indicate the modulation format of CQI/PMI.

Otherwise, if DCI format 0B indicates both TBs (CWs) are enabled (although no data TB is transmitted in one of the CWs, and only UCI is transmitted in this CW), then an additional rule is applied:

If only one TB's MCS index is equal to 29, then the NDI of this TB is used to indicate the modulation format.

If both TB's MCS indices are equal to 29, then two options exist. In Option 1, the NDI of the 1st TB is always used to indicate modulation format of CQI/PMI. In Option 2, the NDI of the 2nd TB is always used to indicate the modulation format of CQI/PMI.

Once the NDI bit is specified by the above rule, the mapping from NDI bit to the modulation order for Option 1, for example, is shown in the table below:

| NDI | Modulation order of the CQI/PMI $Q_m$ |
|---|---|
| 0 | 2 |
| 1 | 4 |

The expected behavior of the above embodiment is further described below.

An embodiment where TB1 is transmitted in CW0 and TB2 is transmitted in CW1 is considered.

If CQI/PMI is to be transmitted by CW0, NDI1 (NDI of TB1) indicates the modulation order as shown below:

| NDI1 | Modulation order of the CQI/PMI $Q_m$ |
|---|---|
| 0 | 2 |
| 1 | 4 |

If CQI/PMI is to be transmitted by CW1, NDI2 (NDI of TB2) indicates the modulation order as shown below:

| NDI2 | Modulation order of the CQI/PMI $Q_m$ |
|---|---|
| 0 | 2 |
| 1 | 4 |

An embodiment where TB1 is transmitted in CW1 and TB2 is transmitted in CW0 (if swap bit is applicable) is considered.

If CQI/PMI is to be transmitted by CW0, NDI2 indicates the modulation order.

If CQI/PMI is to be transmitted by CW1, NDI1 indicates the modulation order.

In addition, if the UE receives a DCI format 0 or an UL DCI format that can indicate on TB (variation of format 0), then in the case of CQI-only transmission, this disclosure provides two options of determining the modulation order:

Option 1: always use QPSK, and

Option 2: use the NDI bit to indicate the modulation format, similar to the method proposed above for format 0B.

In some embodiments of this disclosure, when a UE receives a DCI 0B indicating a CQI-only request, i.e., when Conditions 1, 2 and 3 are satisfied ($N_{PRB} \leq T_{PRB}$ CQI request=1, and at least one MCS index is 29), the modulation order of the CQI/PMI is jointly determined by the CSI IE of the DCI format and the one selected NDI bit. An example table is as follows:

| CSI value belonging to | NDI | Modulation order of the CQI/PMI $Q_m$ |
|---|---|---|
| Subset 1 (e.g., {0, 1, 2, 3}) | 0 | 2 |
|  | 1 | 4 |
| Subset 2 (e.g., {4, 5, 6, 7}) | 0 | 2 |
|  | 1 | 6 |

In addition to the conditions discussed above for indicating CQI-only request, further embodiments are provided by this disclosure.

In one embodiment of this disclosure, CQI-only request in LTE-A is indicated to a UE when IEs in DCI 0B intended for the UE satisfy the following three conditions (assuming CQI is always transmitted on CW 0):

Condition 1: If the MCS associated with CW0 is 29,
this MCS can be associated with either TB1 or TB2 in the case in which 1 TB (CW) is enabled, and
this MCS is associated with TB1 in the case in which 2 TBs (2 CWs) are enabled assuming no swap bit. Otherwise, both TBs are possible.

Condition 2: CQI request=1.

Condition 3: $N_{PRB} \leq T_{PRB}$.

In some embodiments of this disclosure, CQI-only request in LTE-A is indicated to a UE when IEs in DCI 0B intended for the UE satisfy the following three conditions:

Condition 1: If only 1 TB (CW) is enabled, the MCS associated with CW0 is 29. If 2 TBs (CWs) are enabled, the MCS associated with CW1 is 29.

Condition 2: CQI request=1,

Condition 3: $N_{PRB} \leq T_{PRB}$.

Figure 6:
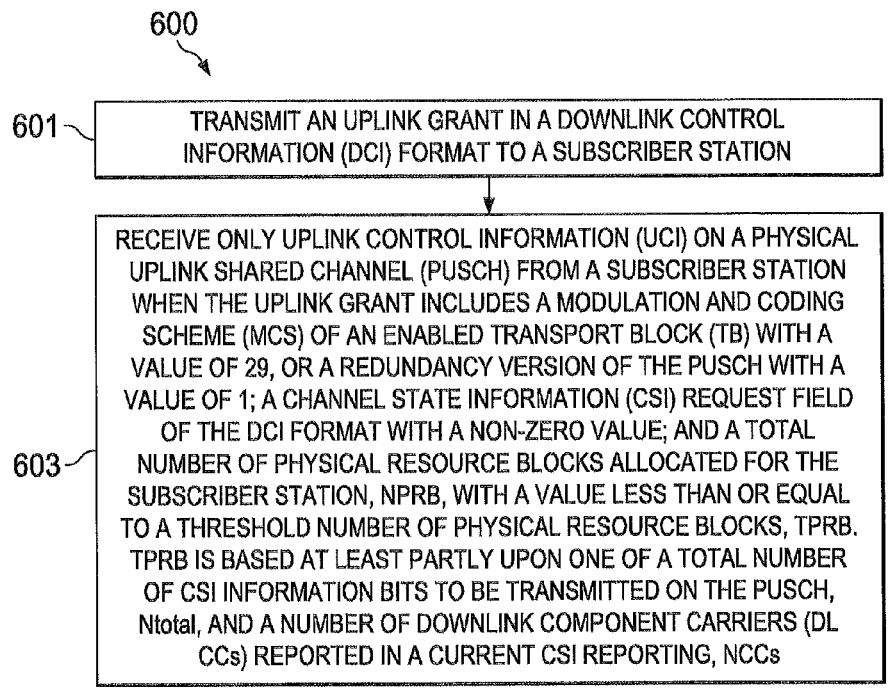
FIG. 6 illustrates a method of operating a base station according to an embodiment of this disclosure.

FIG. 6 illustrates a method 600 of operating a base station according to an embodiment of this disclosure.

As shown in FIG. 6, method 600 includes transmitting an uplink grant in a downlink control information (DCI) format to a subscriber station (block 601). Method 600 also includes receiving only uplink control information (UCI) on a physical uplink shared channel (PUSCH) from the subscriber station when the uplink grant includes a modulation and coding scheme (MCS) of an enabled transport block (TB) with a value of 29, or a redundancy version of the PUSCH with a value of 1; a channel state information (CSI) request field with a non-zero value; and a total number of physical resource blocks allocated for the subscriber station, $N_{PRB}$, with a value less than or equal to a threshold number of physical resource blocks, $T_{PRB}$. $T_{PRB}$ is based at least partly upon one of a total number of CSI information bits to be transmitted on the PUSCH, $N_{total}$, and a number of downlink component carriers (DL CCs) reported in a current CSI reporting, $N_{CCs}$ (block 603).

In some embodiments, when the DCI format is DCI format 4, the uplink grant further includes a transmission rank of the UCI information with a value of 1 when receiving only UCI on the PUSCH from the subscriber station.

Figure 7:
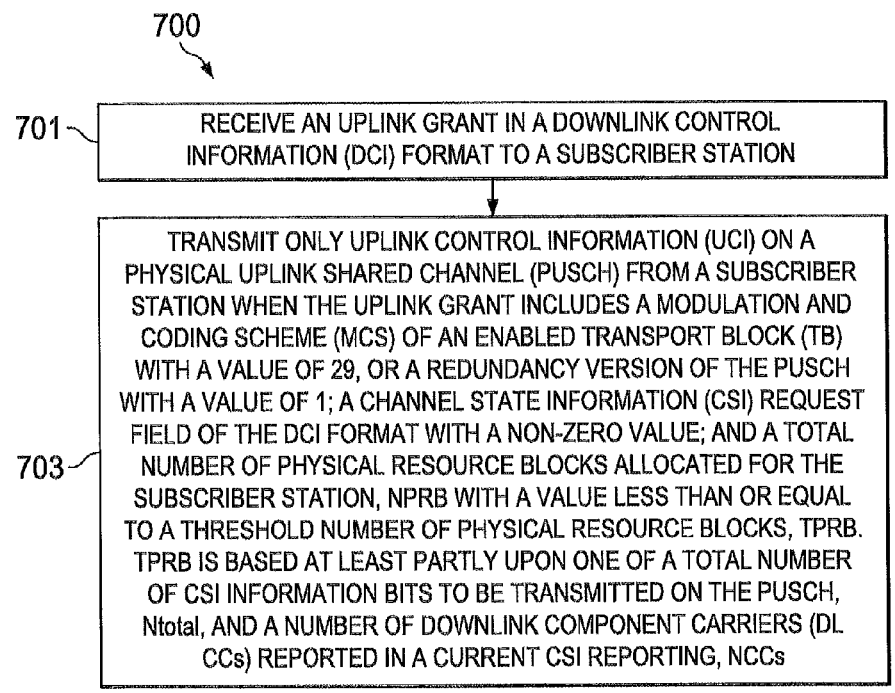
FIG. 7 illustrates a method of operating a subscriber station according to an embodiment of this disclosure.

FIG. 7 illustrates a method 700 of operating a subscriber station according to an embodiment of this disclosure.

As shown in FIG. 7, method 700 includes receiving an uplink grant in a downlink control information (DCI) format 4 from a base station (block 701). Method 700 also includes transmitting only uplink control information (UCI) on a physical uplink shared channel (PUSCH) to the base station when the uplink grant includes a modulation and coding scheme (MCS) of an enabled transport block (TB) with a value of 29, or a redundancy version of the PUSCH with a value of 1; a channel state information (CSI) request field with a non-zero value; and a total number of physical resource blocks allocated for the subscriber station, $N_{PRB}$, with a value less than or equal to a threshold number of physical resource blocks, $T_{PRB}$. $T_{PRB}$ is based at least partly upon one of a total number of CSI information bits to be transmitted on the PUSCH, $N_{total}$, and a number of downlink component carriers (DL CCs) reported in a current CSI reporting, $N_{CCs}$ (block 703).

In some embodiments, when the DCI format is DCI format 4, the uplink grant further includes a transmission rank of the UCI information with a value of 1 when transmitting only UCI on the PUSCH from the subscriber station.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station, comprising:
receive path circuitry configured to receive only Uplink Control Information (UCI) on a Physical Uplink Shared CHannel (PUSCH) from a subscriber station when an uplink grant to the subscriber station includes:
either a modulation and coding scheme (MCS) of an enabled transport block (TB) with a value of 29 or a redundancy version of the PUSCH with a value of 1,
a channel state information (CSI) request field with a non-zero value, and
a total number of physical resource blocks $N_{PRB}$ allocated for the subscriber station with a value less than or equal to a threshold number of physical resource blocks $T_{PRB}$,
wherein the threshold number of physical resource blocks varies based at least partly upon a number of downlink component carriers (DL CCs) reported in current CSI reporting.

2. The base station according to claim 1, wherein the CSI request field has a non-zero value when carrier aggregation is configured.

3. The base station according to claim 1, wherein the CSI request field has a non-zero value when either carrier aggregation is not configured.

4. The base station according to claim 1, wherein the CSI request field has a non-zero value when carrier aggregation is configured and a Downlink Control Information (DCI) is transmitted in a search space specific to the subscriber station.

5. The base station according to claim 1, wherein the CSI request field has a non-zero value when either carrier aggregation is not configured or a Downlink Control Information (DCI) is transmitted in a search space specific to a cell.

6. The base station according to claim 1, wherein the total number of physical resource blocks $N_{PRB}$ allocated for the subscriber station is less than or equal to 4 when the CSI request field has a non-zero, two bit value set for CSI reporting.

7. The base station according to claim 1, wherein the total number of physical resource blocks $N_{PRB}$ allocated for the subscriber station is less than or equal to 4 when the CSI request field has a non-zero, one bit value set for CSI reporting.

8. A method, comprising:
receiving only Uplink Control Information (UCI) at a base station on a Physical Uplink Shared CHannel (PUSCH) from a subscriber station when an uplink grant to the subscriber station includes:
either a modulation and coding scheme (MCS) of an enabled transport block (TB) with a value of 29 or a redundancy version of the PUSCH with a value of 1,
a channel state information (CSI) request field with a non-zero value, and
a total number of physical resource blocks $N_{PRB}$ allocated for the subscriber station with a value less than or equal to a threshold number of physical resource blocks $T_{PRB}$,
wherein the threshold number of physical resource blocks varies based at least partly upon a number of downlink component carriers (DL CCs) reported in current CSI reporting.

9. The method according to claim 8, wherein the CSI request field has a non-zero value when carrier aggregation is configured.

10. The method according to claim 8, wherein the CSI request field has a non-zero value when either carrier aggregation is not configured.

11. The method according to claim 8, wherein the CSI request field has a non-zero value when carrier aggregation is configured and a Downlink Control Information (DCI) is transmitted in a search space specific to the subscriber station.

12. The method according to claim 8, wherein the CSI request field has a non-zero value when either carrier aggregation is not configured or a Downlink Control Information (DCI) is transmitted in a search space specific to a cell.

13. The method according to claim 8, wherein the total number of physical resource blocks $N_{PRB}$ allocated for the subscriber station is less than or equal to 4 when the CSI request field has a non-zero, two bit value set for CSI reporting.

14. The method according to claim 8, wherein the total number of physical resource blocks $N_{PRB}$ allocated for the subscriber station is less than or equal to 4 when the CSI request field has a non-zero, one bit value set for CSI reporting.

15. A subscriber station, comprising:
a transmitter configured to transmit only Uplink Control Information (UCI) on a Physical Uplink Shared CHannel (PUSCH) to a base station when an uplink grant to the subscriber station includes:
either a modulation and coding scheme (MCS) of an enabled transport block (TB) with a value of 29 or a redundancy version of the PUSCH with a value of 1,
a channel state information (CSI) request field with a non-zero value, and
a total number of physical resource blocks $N_{PRB}$ allocated for the subscriber station with a value less than or equal to a threshold number of physical resource blocks $T_{PRB}$,
wherein the threshold number of physical resource blocks varies based at least partly upon a number of downlink component carriers (DL CCs) reported in current CSI reporting.

16. The subscriber station according to claim 15, wherein the CSI request field has a non-zero value when carrier aggregation is configured.

17. The subscriber station according to claim 15, wherein the CSI request field has a non-zero value when either carrier aggregation is not configured.

18. The subscriber station according to claim 15, wherein the CSI request field has a non-zero value when carrier aggregation is configured and a Downlink Control Information (DCI) is transmitted in a search space specific to the subscriber station.

19. The subscriber station according to claim 15, wherein the CSI request field has a non-zero value when either carrier aggregation is not configured or a Downlink Control Information (DCI) is transmitted in a search space specific to a cell.

20. The subscriber station according to claim 15, wherein the total number of physical resource blocks $N_{PRB}$ allocated for the subscriber station is less than or equal to 4 when the CSI request field has a non-zero, two bit value set for CSI reporting.

21. The subscriber station according to claim 15, wherein the total number of physical resource blocks $N_{PRB}$ allocated for the subscriber station is less than or equal to 4 when the CSI request field has a non-zero, one bit value set for CSI reporting.

22. A method, comprising:
transmitting only Uplink Control Information (UCI) to a base station on a Physical Uplink Shared CHannel (PUSCH) from a subscriber station when an uplink grant to the subscriber station includes:
either a modulation and coding scheme (MCS) of an enabled transport block (TB) with a value of 29 or a redundancy version of the PUSCH with a value of 1,
a channel state information (CSI) request field with a non-zero value, and
a total number of physical resource blocks $N_{PRB}$ allocated for the subscriber station with a value less than or equal to a threshold number of physical resource blocks $T_{PRB}$,
wherein the threshold number of physical resource blocks varies based at least partly upon a number of downlink component carriers (DL CCs) reported in current CSI reporting.

23. The method according to claim 22, wherein the CSI request field has a non-zero value when carrier aggregation is configured.

24. The method according to claim 22, wherein the CSI request field has a non-zero value when either carrier aggregation is not configured.

25. The method according to claim 22, wherein the CSI request field has a non-zero value when carrier aggregation is configured and a Downlink Control Information (DCI) is transmitted in a search space specific to the subscriber station.

26. The method according to claim 22, wherein the CSI request field has a non-zero value when either carrier aggregation is not configured or a Downlink Control Information (DCI) is transmitted in a search space specific to a cell.

27. The method according to claim 22, wherein the total number of physical resource blocks $N_{PRB}$ allocated for the subscriber station is less than or equal to 4 when the CSI request field has a non-zero, two bit value set for CSI reporting.

28. The method according to claim 22, wherein the total number of physical resource blocks $N_{PRB}$ allocated for the subscriber station is less than or equal to 4 when the CSI request field has a non-zero, one bit value set for CSI reporting.

* * * * *